Aug. 18, 1942.  T. H. McCLAIN  2,293,656
TRANSPARENT CLOSURE AND MOUNTING
Filed Jan. 3, 1942  2 Sheets-Sheet 1
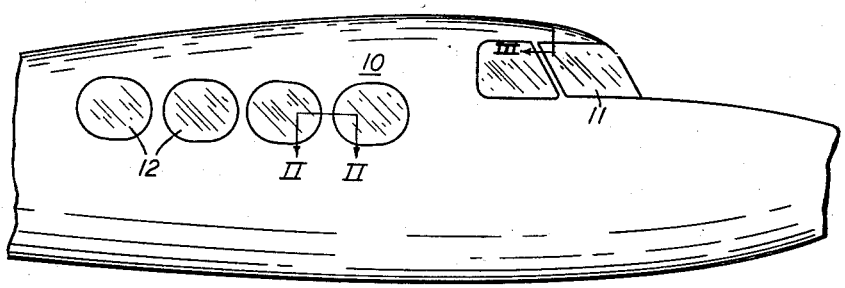
Fig—I
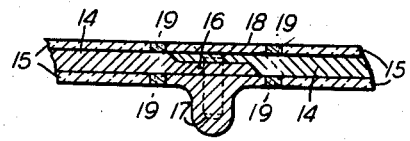
Fig—II
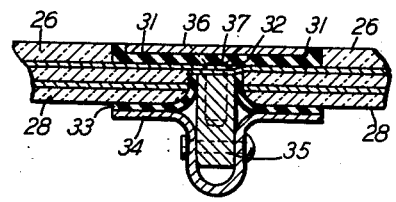
Fig—V
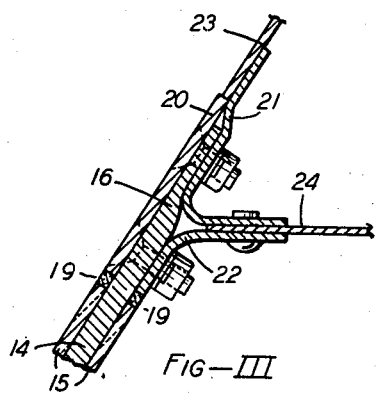
Fig—III
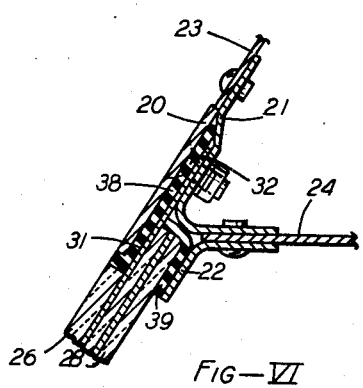
Fig—VI
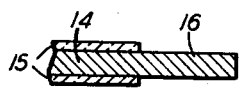
Fig—IV
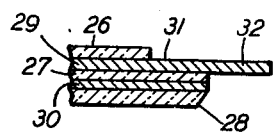
Fig—VII
INVENTOR
THOMAS H. MCCLAIN
BY George C. Sullivan Aug. 18, 1942.    T. H. McCLAIN    2,293,656
TRANSPARENT CLOSURE AND MOUNTING
Filed Jan. 3, 1942    2 Sheets-Sheet 2
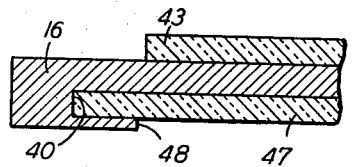
FIG-VIII
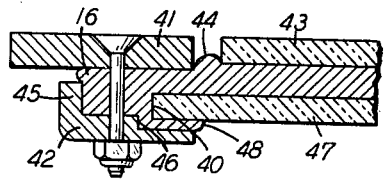
FIG-IX
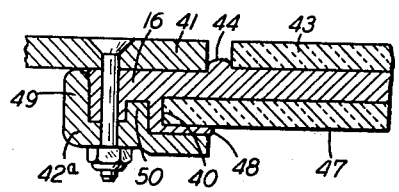
FIG-X
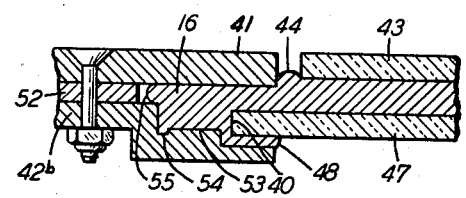
FIG-XI
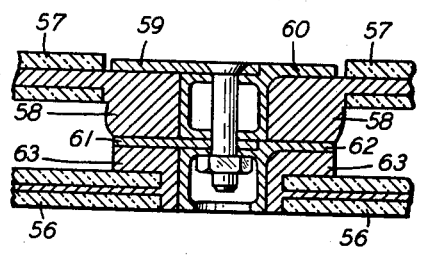
FIG-XII
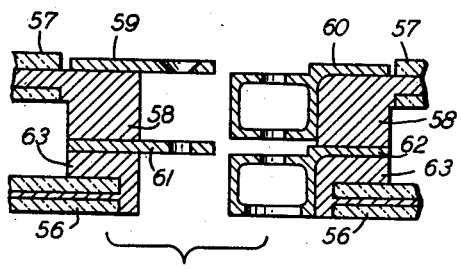
FIG-XIII
INVENTOR
THOMAS H. McCLAIN
BY George C. Sullivan Patented Aug. 18, 1942

2,293,656

UNITED STATES PATENT OFFICE 2,293,656

TRANSPARENT CLOSURE AND MOUNTING

Thomas H. McClain, Altadena, Calif., assignor to Lockheed Aircraft Corporation, Burbank, Calif.

Application January 3, 1942, Serial No. 425,573

18 Claims. (Cl. 189—64)

This invention relates to improved transparent closure means in the form of laminated safety glass and to mounting means therefor adapting the same for use in windshield and/or window or door installations subject to severe operating conditions such as extremely high wind pressure, mechanical vibration, shocks, torsional stresses, temperature differentials, etc., said closure means being particularly useful in installations where it is desired to maintain a water- and air-tight or leak-proof seal between the laminated windshield or window material and the opening or mounting frame which receives the same.

While substantial improvements have been made in the recent past in laminated safety glass per se, and in various glass mounting arrangements for use in airplanes, the problem of preventing rain water from gaining entrance around the edges of the windshield into the cockpit and wetting the pilot and/or instrument panel, etc., has not been satisfactorily solved. Consequently, one of the chief sources of complaint from present day pilots arises from leakage around the windshield.

Various plastics such as the acrylic resins, used to make "Plexiglas," etc., are employed to some extent in windshield constructions, but these generally are subject to a great many objections due to the ease with which they become scratched and thus lose their clearness, their high coefficient of expansion requiring special design considerations, the necessity for using tools in drilling and sawing the same to shape in their hard condition, etc.

In addition, safety glass with various interlayer materials has been tried, including an interlayer of polymerized acrylic acid esters. It is understood, however, that laminated safety glass with such interlayer has not come into successful commercial use because of certain manufacturing difficulties and also because of the inability of the interlayer to withstand a prerequisite range of temperatures so as to provide satisfactory performance under normal temperature conditions. Thus, if the interlayer were so formulated as to maintain satisfactory toughness at winter temperatures, it would be weak and soft at summer temperatures; if formulated to give satisfactory performance at high temperatures, it would be brittle in winter. However, regardless of the form of closure or interlayer employed, it has been extremely difficult, especially in airplanes, to maintain a leak-proof joint around the windshield even when rubber gaskets and other sealing materials are employed. The ever-increasing speed of airplanes generally, the exacting requirements of dive bombers, and the use of pressure cabins for high altitude flying have further contributed to making the problem of sealing the windshield and other transparent airplane closures more difficult.

One method now commonly used for installing safety glass in airplanes comprises placing a rubber or other resilient channel about the edges of the glass, which channel is thereafter forced into or clamped in a receiving channel provided therefor in the windshield or window structure or frame. In the severe service to which airplanes are subjected, a combination of causes including aging of the rubber, extreme temperature changes, vibration, torsional stresses, weaving action, wind and air pressure against the glass, etc., apparently prevents permanent sealing contact between the glass and rubber and the structures in which they are mounted. Hence, rain is often driven around the edges of the glass and sprayed into the cockpit with some force in the case of windshields and similar closures subject to the impact or relative flow of air at high speeds.

Safety glass, as heretofore commercially used, has usually included two or three plies of relatively thin plate glass bonded together by interlayers or thin sheets of transparent plastic material of substantially the same area as the glass.

A comparatively new organic plastic now used as an interlayer in safety glass is a vinyl acetal, more specifically known as polymerized vinyl butyral. This same plastic, as will appear more fully hereinafter, is employed in the transparent closure means disclosed herein, but in a new and novel manner such as to afford advantages and new results not heretofore obtainable with any known materials or closure construction.

The present invention resulted from a conception of a laminated safety glass having a plastic interlayer of such rubber-like characteristics that the interlayer could be extended beyond the marginal edges of the glass and made sufficiently thick to be utilized as a gasket or leak-proof sealing means and at the same time serve as a resilient supporting means for the glass itself so that the glass could be spaced at its edges from its mounting frame without requiring any clamping pressure to be applied to the glass. Polyvinyl butyral was found to be one material suitable for practically embodying the foregoing conception.

In practicing the present invention the polyvinyl butyral plastic provides a bond that is sufficiently soft, pliable, flexible, resilient, deformable, and "flowable" or compressible, to serve as a built-in "gasket" for sealing the laminated glass in an opening or mounting frame. This material, nevertheless, also has adequate mechanical strength to withstand high unit pressures without failure. This is important because in high altitude flying failure of the closure may result in the pilot and passengers getting the "bends."

One of the important improvements of this invention relates to providing a safety glass unit having an integral elastic sealing arrangement projecting around the edges of the glass and of sufficient thickness so that it can serve the dual purpose of supporting as well as sealing the glass. In certain installations the sealing effect of the projecting portion of the plastic may be supplemented by rubber or other sealing means, particularly if the glass area is subjected to differential pressures, as in supercharged cabin arrangements for high altitude flying.

The invention more particularly relates to a laminated closure comprising at least two sheets of glass or other hard transparent material having an intervening layer of relatively soft, resilient, tough, displaceable, highly compressible, yieldable, somewhat stretchable, water-proof, etc. plastic material therebetween, the plastic material extending beyond the marginal edges of one or all of the sheets of relatively hard material and being adapted to be secured or clamped in a frame or other mounting means to provide a leak-proof seal between the plastic material and the frame or mounting means. The intervening layer may be relatively thick or thin compared to the thickness of the relatively hard material, depending upon its intended use. In some instances the portions of the plastic material projecting beyond the marginal edges of the glass may be made thicker than the portions disposed between the hard material to provide certain advantages when clamped in a mounting frame.

The invention also relates to various expedients for mounting the present laminated closure means in an airplane or other structure.

The principal object of the invention is to provide a transparent closure or windshield or window construction for aircraft and other structures which can be so mounted in said structures as to positively prevent the entrance of rain water into said structures.

Another object of the invention is to provide a windshield construction and mounting means therefor which will remain permanently water and air-tight and which will not develop leaks under the most severe operating conditions.

Another object of the invention is to provide an improved sheet of transparent laminated material for use as windshields, etc., which includes as an integral part thereof gasket-like means adapted to yield under compressive force to form a water and air-tight seal at the marginal edges thereof.

Another object of the invention is to provide a sheet of laminated safety glass having a projecting flexible peripheral portion capable of serving as a supporting means for the glass without imposing twisting stresses thereon which would tend to break said glass.

A still further object of the invention is to provide an improved safety glass unit arranged so that it can be mounted without requiring any clamping pressure to be imposed upon the layers of glass comprising said laminated unit.

Still another object of the invention is to provide an improved laminated sheet of safety glass having an interlayer of flexible, deformable, rubber-like material projecting beyond the marginal edges of the glass and which projecting interlayer can be readily cut to shape and/or provided with apertures without requiring heating or the use of saws, drills, etc., to fit and adapt said interlayer for mounting in an opening of a given configuration.

A further object of the invention is to provide a laminated windshield or window construction that can be mounted in a frame or window opening in water and air-tight relation without necessarily requiring the use of extraneous sealing materials such as rubber gaskets, packing, etc.

Another object of the invention is to provide a laminated safety glass unit that can be mounted with a minimum of time and expense.

Another object of the invention is to provide an improved windshield or transparent closure mounting that can be effectively and permanently rendered air and water-tight, and yet which can be readily and quickly dismounted and replaced without damage to or impairment of the effectiveness of the sealing means.

Another object of the invention is to provide a strong transparent closure of the type described wherein substantial weight savings can be made by utilizing thin glass protective layers for the optical correction and surface protection of a thick intermediate layer of transparent, tough, flexible, elastic, highly compressible or flowable, etc., water-proof plastic resin material, of the type now used in relatively thin sheets in safety glass.

A further object of the invention is to provide an improved safety glass mounting wherein the outer surface of the glass can be positioned substantially flush with the surrounding surface to reduce air friction and eddy currents.

A still further object of the invention is to provide an improved safety glass having a resilient and plastic transparent interlayer of the type described that will yield under impact and so help resist penetration of the glass by objects striking the same.

Other and further objects of the invention will be apparent from the following description taken in connection with the accompanying drawings in which:

Fig. I is a diagrammatic fragmentary side elevation of an airplane fuselage showing windshield and window locations;

Fig. II is an enlarged fragmentary sectional view taken on the line II—II of Fig. I showing one form of the invention as applied to a post between adjacent windows;

Fig. III is an enlarged fragmentary sectional view taken on the line III—III of Fig. I, illustrating the application of the principles of the invention to the upper edge of a windshield;

Fig. IV is a fragmentary enlarged section of the edge portion of a transparent laminated sheet of material such as shown in Figs. II and III, the plastic interlayer, however, being of substantially uniform thickness;

Figs. V, VI and VII are similar to Figs. II, III and IV, respectively, but disclose another form of laminated transparent material consisting of three sheets of glass and two sheets of plastic arranged and associated with rubber sealing means so as to better resist leakage under pressure differential conditions;

Fig. VIII is a fragmentary sectional view of an edge portion of a modified laminated glass unit wherein the glass sheets are of different size and the projecting marginal portion of the interlayer is shown substantially thicker than the portion thereof between the sheets of glass and extending around the edge of one of said sheets;

Fig. IX is a fragmentary sectional view showing a mounting means for a laminated sheet such as illustrated in Fig. VIII;

Fig. X illustrates a modification of the mounting means shown in Fig. IX, wherein the clamping means is formed to provide a more effective grip on the plastic material;

Fig. XI illustrates a further modification of the mounting means shown in Fig. IX;

Fig. XII is an enlarged fragmentary sectional view of the juncture of two double paned transparent closures or panels, such as may be used in a windshield, there being an air space between the panels; and Fig. XIII is a disassembled view of the panel parts shown in Fig. XII.

The several embodiments of the invention chosen for illustrative purposes refer to the use of safety glass sealed in various openings in an airplane body or fuselage 10, for example, the windshield 11 and side windows 12. Normally the openings for the windshield and window will be defined by structural members of the fuselage, such as ribs and longerons, but for the purposes of this invention the closure clamping frames or mounting will be described without regard thereto.

While the term "plate glass" is used in the description, it will be understood that this is for convenience only and that other types of glass, or glass substitutes including various hard transparent resins such as acrylate plastics may be used in practicing the invention in lieu of said plate glass. It will also be understood that the term "compressible" employed to define one of the characteristics of the plastic interlayer is used herein in the sense that the plastic interlayer is readily deformable or "flowable" under clamping pressure; there being no material change in total volume. In fact upon release of the compressive force the plastic tends to return to its original shape and dimensions. Upon the application of local compressive pressure, the thickness of the plastic can be readily reduced to one-half or one-third its original thickness, but ordinarily such degree of compression is unnecessary to provide the desired seal.

In the form of the invention disclosed in Figs. II to IV, it is proposed to use a transparent closure unit 13 comprising a relatively thick central lamination 14 of a transparent, tough, flexible, elastic, rubber-like, compressible, and waterproof synthetic resin that is plastic over a wide range of normal temperatures, such as polymerized vinyl butyral resin, for example. The thick lamination of plastic material 14 is bonded between relatively thin outer layers of plate glass 15 for improved optical qualities and abrasion resistance; the use of semi-heat treated glass adding greatly to the strength of the lamination. The plastic material 14 projects beyond the marginal edges of the glass plates 15, as generally indicated at 16 in Fig. IV to provide means for attaching and sealing the laminated panel in a suitable frame.

As shown in Figure II, such a frame may comprise a post or inner member 17 between adjacent window openings 12, the closures 13 having their adjacent projecting edges 16, of the central plastic lamination 14, scarfed and overlapped, and clamped against the post 17 by an outer closure frame 18 secured in place by any suitable means such as screws 18a. If the inner members 17 form a frame separate from the fuselage structure, the outer frame 18 may be a part of the fuselage skin, in the case of metal airplanes. It is, of course, unnecessary to scarf the projecting edge 16 of the plastic material 14 (note Fig. IV) if a second closure or window arrangement is not used, or if said second closure is spaced substantially farther away than shown.

With the foregoing arrangement it will be evident that the outer surfaces of the glass plates 15 are flush with the outer surface of the frame 18, and that the edges of the glass plates 15 are slightly spaced from the frame element to avoid transmission of mechanical vibrations to the glass, the space being filled with a suitable plastic composition 19 to smooth over the gap thus formed.

For locations subject to severe exposure and stresses, as in the windshield 11, a double clamping arrangement, such as illustrated in Figure III, may be used. As shown, the projecting edge 16 of the plastic center lamination 14 is of greater extent and is slightly reduced in thickness for the outer half of the projected portion thereof, an outer cover plate or frame 20 being bolted through the projecting end 16 of the plastic to inner flanges 21 and 22 which in turn are secured to the fuselage skin 23 and an internal partition 24. This arrangement also permits a substantially flush mounting of the outer glass surface with the skin of the fuselage.

In the form of the invention disclosed in Figures V, VI and VII the closure comprises three glass layers 26, 27 and 28, with two intervening relatively thin plastic layers 29 and 30, the outer glass layer 26 being of reduced dimensions or rebated to provide a plastic clamping land 31, while the plastic is extended beyond the margin of the other glass sheets 27 and 28 and plastic layer 30 to provide a sealing strip 32.

In Figure V the triplex closures have their sealing strips 32 overlapped and their glass layers 27 and 28 seated upon inner rubber gaskets 33 supported by a bracket 34 and post 35; an outer closure frame 36, which may be the skin of the fuselage, seating against and compressing both an outer rubber gasket 37 and the overlapped ends of the sealing strips 32, the gasket 37 also engaging the clamping lands 31 of said strips.

Figure VI closely resembles the frame or structure described in connection with Figure III, the cover plate or frame 20 compressing a rubber-like gasket 38 against the sealing strip 32 and the clamping land 31 while the glass layers 27 and 28 bear against an inner gasket 39.

In both Figures V and VI the rubber-like gaskets are provided to insulate the glass from mechanical vibrations or distortions of the fuselage structure. The mounting arrangements of these figures also help to resiliently support the safety glass if it is subjected to differential pressures, as would be the case in sealed and supercharged cabins intended for high altitude work.

When a thin plastic layer is extended for use as a gasket, as in Figure VII, the laminated glass can be quite firmly mounted without danger of localized strains, as the plastic 29 takes care of inequalities in the mounting to assure efficient action as a pliant and deformable gasket. However, the further use of the rubber-like channels, as shown in Figs. V and VI, aids in compensating for weaving or working of the supporting structure, thus avoiding the transmission of unknown forces to the glass laminations.

If desired, the projecting plastic edge 16 may be built up to a thickness greater than that part of the plastic between the glass panes, as in Figures VIII, IX, X and XI, in which case it is desirable to bond the plastic to the adjacent edge and/or opposite side of one or both of the glass panes. Such thickened margins are simple to produce, as a series of layers of the plastic can be bonded into an integral whole, without evidence of cleavage planes.

As shown in Figure VIII, the laminated unit may comprise outer and inner glass sheets 43 and 47, respectively, bonded together by a layer of polymerized vinyl butyral thickened as indicated at 16 and overlapping the inner side of the sheet 47 as indicated at 48. The plastic is preferably bonded at 40 to the edge of the glass 47 and also over the area of the extension 48.

Such an extension 48 could also be used in place of the rubber gaskets shown in Figs. V and VI.

Referring now to Figure IX, a portion of the outer skin of the airplane fuselage, suitably cut out for the desired window opening, is indicated at 41, an inner frame 42 being bolted thereto at intervals to clamp the plastic margin 16 thereagainst with the outer surface of the laminated glass 43 flush with the skin. The outer pane 43 of the glass is slightly narrower than the opening in the skin to avoid contact and consequent transmission of unknown forces thereto. The clamping or compressive pressure on the plastic margin causes said plastic to flow or bulge outwardly, as at 44, between the skin 41 and glass 43. The gap at this point is preferably filled with a suitable composition to provide a smooth, flush outer surface, as at 19 in Fig. II.

The frame 42 is provided with a peripheral flange 45 that is not intended to contact the skin 41, and the plastic also bulges out between the flange and the skin as at 44a. The inner surface of the frame 42 may be stepped as at 46 to further grip the plastic which can be extended between the frame and the underlying portion of the inner surface of the glass 47, as indicated by the numeral 48.

In Figure X the inner or clamping frame 42a has a peripheral flange 49 bearing against the skin 41 when clamped tight, the plastic being extended between the glass 47 and the frame as before. An intermediate tongue 50 on the frame 42a serves to partially displace and grip the plastic margin 16, which bulges or flows outwardly at 44. The tongue 50 also prevents scalloping of the plastic between the bolt holes when the joint is under tension stresses. This arrangement provides a relatively rigid mount wherein internal cabin pressure can displace the laminated closure slightly outward to prevent the transmission of pressure between the inner pane and the frame, the presence of the confined plastic margin 48 preventing excessive initial pressure at this point.

In Figure XI, the frame 42b may be arranged to be clamped in metallic contact with the skin 41, or a spacer 52 may be used between said frame and skin is desired. Clamping pressure on the plastic is provided by a land 53 on the frame 42b which displaces the confined plastic into recesses 54 and 55 and effectively isolates the inner pane 47 from contact with the frame 42b.

Figures XII and XIII illustrate an application of my invention to a windshield or transparent cockpit enclosure structure comprising spaced inner and outer laminated panels 56 and 57 defining a dead air space therebetween. Such windshields are preferably made in sections of convenient size joined by posts or rails, and a post is shown divided and bonded to thick plastic margins joining the inner and outer panels into a unit effectively sealing the dead air space between the panels. The outer panel 57 is shown with a thick plastic interlayer in order to best resist impact, the projecting margins 58 of the plastic being bonded to the edge of the inner pane, as well as the interengaging post members 59 and 60 on its outer side while being built up on its inner side for bonding to secondary or duplicate post members 61 and 62 which in turn are bonded to a thickened plastic margin 63 integral with the thin plastic bond used in the inner panels 56. Thus, the inner panel is resiliently supported by the plastic cushion 63 against internal pressure acting thereon; and the plastic margin 58 of the outer panel is compressed slightly by bolting the post members 59 and 60 in assembled position as shown in Figure XII. It will be noted that the outer panel 57 is not affected by cabin pressure, which might reach a differential pressure of 10 lbs. per square inch in a supercharged cabin plane at extreme altitude; while the inner panel 56 is relieved of shock or impact loads resulting from striking a bird in flight or gravel thrown up by the landing gear.

The synthetic resin plastic employed for both laminating or bonding the glass layers, and forming an integral protruding edge to serve as a gasket, is a vinyl acetal derivative, preferably a polymerized vinyl butyral resin. Such material is translucent before bonding between the glass layers and becomes of water-white transparency after bonding.

The plastic per se, supra, forms no part of the present invention and is commercially available under the general trade name of "Vinal," derived from vinyl butyral.

Vinyl butyral itself, it is understood, may be made by treating a mixture of vinyl acetate and vinyl alcohol with butyraldehyde, and plasticizing the resulting resin by the admixture of triethylene-glycol dihexoate. It is further understood, that an example of suitable proportions to produce the desired combination of mechanical strength, flexibility, resiliency, compressibility or flowability comprises a mixture of approximately 20% vinyl acetate and 80% vinyl alcohol treated with butyraldehyde, the resulting resin having about 30% of the total of triethylene-glycol added to plasticize the mass. The plasticized mass is then calendered or otherwise treated to reduce the same to suitable sheet form.

In one procedure for fabricating a laminated closure unit of the type described, a plurality of glass plates are assembled with interposed sheets of organic plastic material of larger dimensions. The exposed marginal extensions are masked by non-adhesive sheet material, such as Cellophane, or other inert masking material. The assembly is placed in a rubber bag from which air is evacuated. The several elements in the bag are then placed in an autoclave and therein subjected to heat of approximately 220 degrees F., under fluid pressure of approximately 150 pounds per square inch. The several elements of the laminated unit are thus bonded into a composite unit. The closure unit can also be fabricated by placing molding frames around the assembled glass sheets and plastic interlayers wherein the interlayer extensions are masked and then the assembly is subjected to sufficient heat and pressure at values indicated above to effect proper bonding. At the same time the frames provide for maintaining proper shape of the extension at a desired thickness.

It will be understood that, in accordance with the present invention, at least one sheet of plastic material or interlayer will be of larger size than the associated sheets of glass so that the edge portion of the plastic will project beyond all of the marginal edges of one of the sheets of glass 15 as indicated generally at 16 in Figs. IV and VII to provide integral means for supporting, attaching and sealing the laminated unit in a suitable frame.

When ordinary laminated or solid glass is mounted in the usual way, various forces must be exerted on the glass itself to hold and seal it in the frame. Other forces result from thermal expansion of the glass and frame, and twisting, distortion or weaving movement of the frame relative to the glass caused by stresses in the airplane fuselage. These forces are unpredictable but sometimes are large enough to break or crack the glass before any design load is applied thereto. With the present invention the pliable edge mounting does not transfer sudden movements to the glass so that the latter can be designed for known loads.

Glass is usually considered to fail in tension, and accepted values for both the modulus of rupture and the tensile strength are 6500 pounds per square inch for annealed plate glass and 20,000 pounds per square inch for semi-tempered plate glass.

As an operative example of one form of laminated construction, a 14" by 22" panel was made up with two ¼" semi-tempered plate glass sheets bonded to .180" vinyl butyral plastic projecting one inch beyond the margins of the glass, the panel being mounted solely by the plastic margin. This panel withstood a uniform pressure of 24 pounds per square inch.

Another sample formed to simulate aircraft practice, was made up of two 15" square sheets of 7/64" semi-tempered glass bent to a radius of 57" and bonded to 1/8" vinyl butyral plastic with projecting margins, which margins were mounted in a curved panel simulating an aircraft fuselage, the whole being subjected to varying hydraulic pressures. Repeated applications and fluctuations of pressure finally resulted in failure of the glass at a pressure of 11 pounds per square inch without rupture or leakage through the plastic, the plastic in effect acting like a diaphragm without rupturing.

In connection with these experiments, when the two glass sheets of the unit were of the same area, as in Fig. IV, there resulted appreciable body shift of the glass panels when under pressure from one side due to the elasticity or slight stretchability of the plastic. However, this type of mounting is especially effective in resisting shock or impact loads. By way of comparison, a foot square sample of laminated glass comprising two pieces of 7/64" plate glass bonded to a .015" vinyl butyral plastic and conventionally mounted was penetrated by a two pound steel ball dropped from a height of 16 feet; whereas, two sheets of 7/64" semi-tempered glass bonded to and supported only by the protruding margins of a .120" vinyl butyral plastic was not penetrated by a fifty foot drop of a five pound steel ball.

If the above mentioned bodily shifting under differential pressure conditions is objectionable in certain installations, the arrangement shown in Figs. V, VI, and VIII to XI prove advantageous. Here, the outer glass layer is cut back relative to the other layer or layers and either an outward pressure or an inward pressure is carried to some extent by the larger glass thus alleviating the pressure on the plastic and substantially restraining bodily movement of the panel while cushioning and sealing the same.

In the use of the invention the laminated transparent closure may have its edges formed as illustrated in Figs. II or IV, in either case the protruding margin of the bonding or plastic material forms a tough, pliable, resilient, flexible, tenacious and rubber-like deformable gasket having sufficient mechanical strength to itself safely support the transparent closure or panel, the resilience and recoverability of the preferred type of plastic allowing the entire panel to bulge relatively to its frame under load and to return to its initial position upon release of the load. In this form of the invention the layer of plastic is much thicker and tougher than in ordinary laminated safety glass. Moreover, the clamping stresses are uniformly distributed and confined to the plastic rim 16 and thus do not detract from the ultimate strength of the glass proper.

The transparent laminations of Figs. VIII, IX, X and XI differ from those of Figs. II and IV in that the outer glass layer is rebated relative to the inner glass layer and the plastic 16 extends around the edge of said inner layer for both flush mounting and to clamp the plastic layer against the inner glass layer to provide additional support for the closure.

In all forms of the invention the gasket-like integral rim can yield locally under clamping pressure to assure a waterproof and airtight seal, and to compensate for any irregularities in the clamping means, as well as to absorb the severe stresses, shocks, strains and twists to which airplane structures are subjected in use without causing breakage of the glass. The gasket-like rim is also capable of sealing openings in a supercharged cabin without requiring excessive clamping pressures to be imposed upon said rim or on the glass itself.

One of the important and advantageous characteristics of the plastic material employed in the several forms of the invention disclosed herein, as contradistinguished from the relatively hard acrylic resins, is that the present plastic can be readily trimmed with a knife or pair of hand shears to conform to the shape of the opening to receive the same, and any holes required for mounting or securing the same in place can be readily hand punched therein as desired; no saws, drills, shapers, routers, etc. being necessary.

It will be understood that the concepts and principles of the invention disclosed herein are equally useful in many fields besides aviation; for example, the transparent closure can be used for gas mask lenses, guards over grinding wheels, instrument panels, in display cases, refrigerators, pressure and vacuum chambers, port holes, automobiles, etc.

While laminated glass has been shown and described as particularly adapted to the practice of the invention, it is to be understood that glazing units broadly refer to transparent panels including material other than glass. For example, hard resins can be employed for the opposite surfaces of the unit, while marginal portions are maintained sufficiently flexible and resilient to be susceptible to edge clamping and sealing in the manner described with reference to the extensions 16. It is also possible to use the type of interlayer described in connection with transparent hard resins substituted for the sheets of glass.

This application is a continuation-in-part of my copending application Serial No. 333,161, filed May 3, 1940, and my copending application Serial No. 412,225 filed September 25, 1941.

It will be understood that the particular plastic disclosed herein may be replaced by other materials having the same desirable characteristics as set forth and that structural changes may be made in the mounting means shown herein without departing from the spirit of the invention or the scope of the appended claims.

I claim:

1. Laminated safety glass comprising two layers of glass bonded to an intervening layer of transparent plastic material, said plastic material extending beyond the margins of the glass layers to provide a flexible gasket portion, said gasket portion being sufficiently thick and compressible to such an extent as to provide a leak-proof seal when clamped to a supporting structure.

2. A laminated transparent closure comprising a plurality of panes of rigid transparent material and at least one intervening layer of transparent synthetic resin plastic bonded between adjacent surfaces of said panes and extending beyond at least one marginal edge thereof, said extended portion of the bonding layer of plastic being tough, pliant, and being sufficiently thick and being deformable under clamping pressure to such an extent as to provide a leak-proof gasket for the transparent closure when clamped to a supporting structure.

3. A sheet of transparent laminated safety glass for use in airplanes comprising two layers of glass bonded to a resilient, tenacious, readily compressible interlayer of transparent polymerized vinyl butyral resin, said interlayer extending beyond the margins of the layers of glass to provide a flexible gasket portion, said flexible gasket portion being sufficiently thick and compressible to such an extent as to provide a leak-proof seal when clamped in a mounting frame structure.

4. A sheet of transparent laminated safety glass comprising two thin layers of glass bonded to a soft, pliable, resilient interlayer of transparent polymerized vinyl butyral resin, said interlayer being of substantially greater thickness than said thin layers of glass and extending beyond the margins of the layers of glass to provide a flexible gasket portion, said flexible gasket portion being sufficiently thick and compressible to such an extent as to provide a leak-proof seal when clamped to a supporting structure.

5. A sheet of laminated safety glass comprising two layers of glass bonded to an interlayer of transparent polymerized vinyl butyral resin, said interlayer extending beyond the margins of the glass layers to provide a flexible sealing gasket, the extended portions of said interlayer being thicker than and overlying a portion of at least one of said glass layers, said extended portion being compressible to such an extent as to function as a water-tight seal when clamped to a supporting structure.

6. A laminated transparent closure comprising: a plurality of thin panes of transparent material, an intervening layer of resilient, waterproof, transparent plastic bonded between said panes and having peripheral portions projecting beyond the marginal edges of said thin panes, said intervening layer of plastic material being of relatively greater thickness than said panes and compressible to such an extent as to function as a water-tight seal when clamped to a supporting structure.

7. A transparent laminated sheet comprising two layers of hard transparent material bonded to a relatively soft, resilient, flexible interlayer of transparent polymerized vinyl butyral resin, said interlayer extending beyond the margins of the layers of hard material to provide a flexible sealing gasket, the extended portion of said interlayer being substantially thicker than the portions thereof between said layers of hard material and being compressible to such an extent as to function as a water-tight seal when clamped to a supporting structure.

8. A laminated transparent closure for an airplane comprising: a plurality of panes of transparent material, an intervening layer of vinyl resin characterized by its transparency, toughness, flexibility, elasticity and waterproofness bonded between said panes and being of greater area than said panes and having edges projecting beyond the marginal edges of said panes, said projecting edges being of sufficient thickness and compressible to such an extent as to form a water-tight seal when clamped in a mounting frame, and a mounting frame having clamping means for compressing and sealingly gripping said projecting edges of said intervening layer.

9. Closure means comprising: a plurality of laminated sheets arranged adjacent each other, each of said sheets comprising two panes of transparent material having an intervening layer of transparent, waterproof plastic material therebetween, said plastic material extending beyond the marginal edges of said panes, said laminated sheets being juxtaposed with the adjacent extended portions of said plastic material arranged in overlapped relationship, said extended portions of plastic material being of sufficient thickness and compressible to such an extent as to function as a water-tight seal when subjected to clamping pressure, and clamping means securing said laminated sheets in said relationship including fastening means extending through the overlapped portions of said plastic material.

10. Closure means comprising: a plurality of laminated sheets arranged adjacent each other, each of said sheets comprising two panes of transparent material having an intervening layer of relatively soft, resilient, transparent, waterproof plastic material therebetween, said plastic material extending beyond the marginal edges of said panes, said laminated sheets being juxtaposed with the adjacent extended portions of said plastic material arranged in scarfed, overlapped relationship, and means securing said laminated sheets in said relationship including fastening means extending through the extended, overlapped portions of said plastic material.

11. Closure means comprising: a plurality of laminated sheets, each of said sheets comprising two panes of hard transparent material having an intervening layer of resilient, transparent, waterproof plastic material therebetween, said plastic material extending beyond the marginal edges of said panes, said laminated sheets being juxtaposed with the adjacent extended portions of said plastic material arranged in overlapped relationship, and mounting means for said laminated sheets including a cover plate between adjacent panes, overlying the overlapped portions of said plastic material, the outer surface of said cover plate being substantially flush with the outer surface of said adjacent panes.

12. Closure means comprising: a plurality of sheets of laminated safety glass, each of said sheets comprising at least two panes of glass with a layer of resilient, transparent, waterproof plastic material between the panes of glass, said plastic material extending beyond the marginal edges of said panes of glass, said laminated sheets of safety glass being juxtaposed with the adjacent extended portions of said plastic material arranged in overlapped relationship, said extended portions of plastic material being of sufficient thickness and compressible to such an extent as to function as a water-tight seal when subjected to clamping pressure and clamping means securing said laminated sheets of safety glass in said relationship including fastening means extending through the overlapped portions of said plastic material.

13. Closure means comprising: a plurality of laminated sheets arranged in side-by-side relation, each of said sheets comprising at least two panes of transparent material having an intervening layer of transparent, waterproof plastic material between adjacent panes, one of the panes of each sheet extending beyond the marginal edge of another pane of said sheet and said plastic material extending beyond the marginal edge of said extended pane, said laminated sheets being juxtaposed with the adjacent extended portions of said plastic material arranged in overlapped relationship, said extended portions of plastic material being of sufficient thickness and compressible to such an extent as to function as a water-tight seal when subject to clamping pressure and clamping means securing said laminated sheets in said relationship including fastening means extending through the overlapped portions of said plastic material.

14. Closure means comprising: a laminated sheet including at least two panes of transparent material having an intervening layer of transparent, waterproof plastic material between adjacent panes, one of said panes extending beyond the marginal edge of another pane of said sheet and said plastic material extending beyond the marginal edge of said extended pane; and mounting means for said sheet including a frame member adjacent said extended sheet, resilient means on one side of said plastic material between said frame member and said extended sheet, a resilient member on the opposite side of said plastic material, a cover plate overlying said resilient member, and means securing said cover plate to said frame member.

15. Closure means comprising: a plurality of laminated sheets arranged in side-by-side relation, each of said sheets comprising at least two panes of hard transparent material having an intervening layer of transparent, waterproof plastic material between adjacent panes, one of the panes of each sheet extending beyond the marginal edge of another pane of said sheet and said plastic material extending beyond the marginal edge of said extended pane, said laminated sheets being juxtaposed with the adjacent extended portions of said plastic material arranged in overlapped relationship; and mounting means for said laminated sheets including a frame member on one side of said laminated sheets, resilient means on one side of said plastic material between said frame member and said extended sheets, a resilient member on the other side of said plastic material overlying the overlapped portions of said plastic material, a cover plate overlying said resilient member, and fastening means securing said cover plate to said frame member.

16. A laminated transparent closure for an airplane comprising: a plurality of panes of transparent material, and an intervening layer of vinyl resin characterized by its transparency, toughness, flexibility, elasticity and waterproofness bonded between said panes and being of greater area than said panes and having edges projecting beyond the marginal edges of said panes, said projecting edges being of sufficient thickness and compressible to such an extent as to form a water-tight seal when clamped in a mounting frame.

17. A laminated transparent closure comprising a plurality of panes of transparent material, and an intervening layer of polymerized vinyl butyral resin, said intervening layer having an integral rim portion projecting beyond the edges of said panes and being of sufficient thickness, compressibility and resilience to serve the dual purpose of a sealing gasket and resilient support for said closure when clamped to a supporting structure.

18. A laminated transparent closure comprising a plurality of panes of rigid transparent material and an intervening layer of synthetic resin plastic disposed between the adjacent surfaces of said panes, said plastic layer having a rim portion extending beyond the marginal edges of both panes and being of insufficient hardness to preclude intimate bonding thereof to said panes but being sufficiently rigid to serve as a mounting means for said closure when clamped to a supporting structure, said rim portion of said plastic layer being of such thickness and compressible to such an extent as to provide a leak-proof seal when clamped to said supporting structure.

THOMAS H. McCLAIN.